United States Patent [19]

O'Dell et al.

[11] Patent Number: 5,027,358
[45] Date of Patent: Jun. 25, 1991

[54] SWITCH-ADJUNCT COMMUNICATIONS PROTOCOL

[75] Inventors: Thomas M. O'Dell, Longmont; Ricky L. Overmyer, Golden, both of Colo.

[73] Assignee: AT&T Bell Laboratories, Holmdel, N.J.

[21] Appl. No.: 434,389

[22] Filed: Nov. 9, 1989

[51] Int. Cl.⁵ .............................................. G06F 11/00
[52] U.S. Cl. ......................................... 371/62; 371/3; 371/33
[58] Field of Search ..................... 371/62, 32, 33, 20.3, 371/20.1, 3; 379/6, 1, 9, 10, 15, 16, 22, 23; 455/7, 67, 226; 370/13; 375/10

[56] References Cited

U.S. PATENT DOCUMENTS 4,380,088 4/1983 Lipcon ................................. 371/3 X
4,766,596 8/1988 Michels-Krohn ..................... 371/62

OTHER PUBLICATIONS

*Interface Description–Interface Between Customer Premise Equipment–Simplified Message Desk-and Switching System-1AESS*, Bell Communications Research Technical Reference TR-TSY-000283 (Jul. 1985).

"Unisys Multiplies Available SMDI Ports", *Voice Processing*, Jun. 15, 1989, pp. 7–8.

*Primary Examiner*—Jerry Smith
*Assistant Examiner*—Robert W. Beausoliel
*Attorney, Agent, or Firm*—David Volejnicek

[57] ABSTRACT

To provide robustness within the SMSI data communication protocol, a voice message system stores all message-waiting update (MW) messages that it sends to a communication switching system, and periodically transmits a properly-formatted MW message bearing intentionally-corrupted data to the switching system over their connecting data link. After each transmission the voice message system awaits the return on the data link of an invalid message-waiting (IMW) message. If the IMW message is returned within a predetermined time period following transmission of the corrupted MW message, the voice message system treats the data link as viable and clears the stored MW messages. If the IMW message is not returned within the predetermined time period following transmission of each of two corrupted MW messages, the voice message system treats the data link as not viable and, following repair of the link, re-sends the stored MW messages to the switching system.

20 Claims, 3 Drawing Sheets

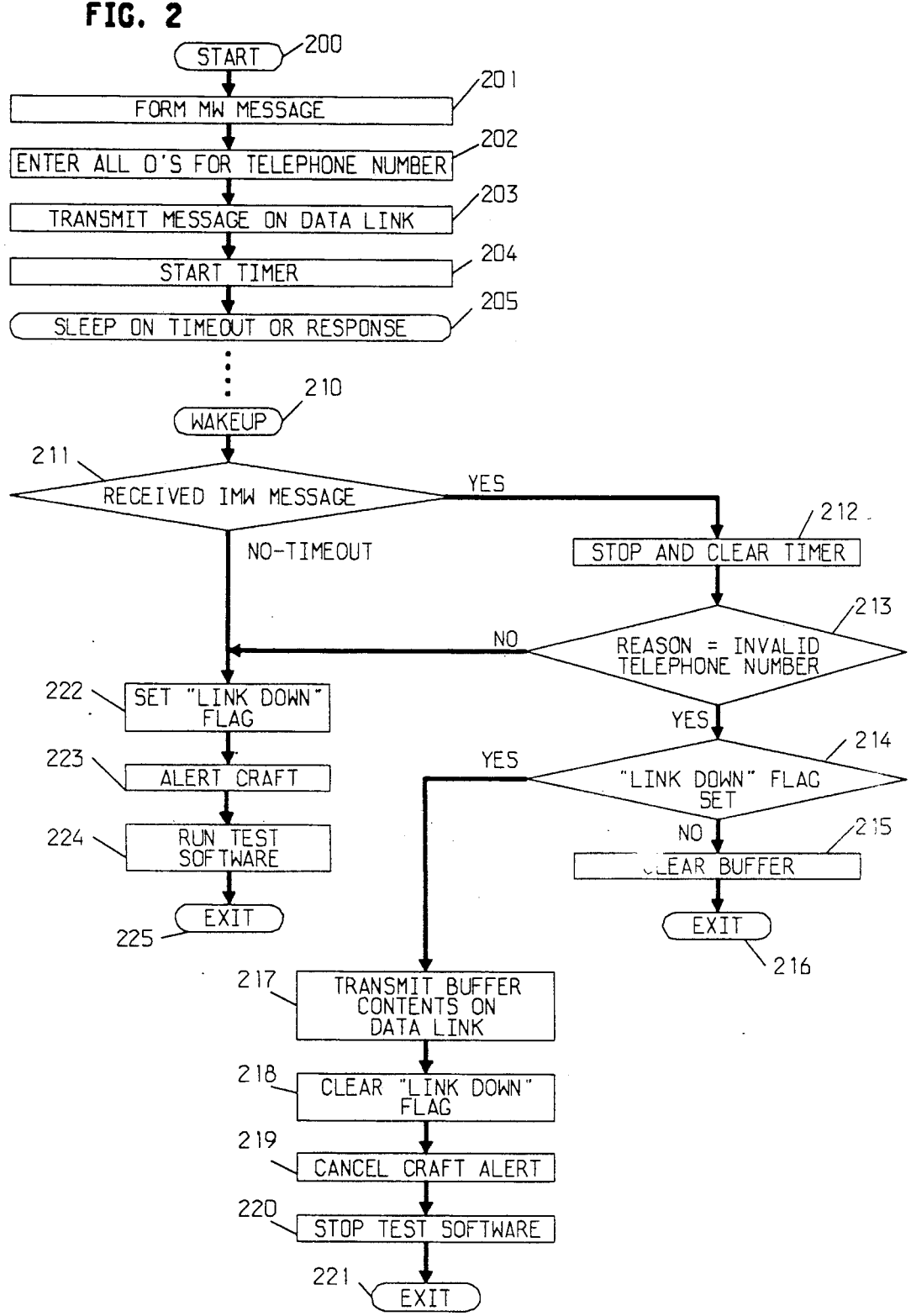

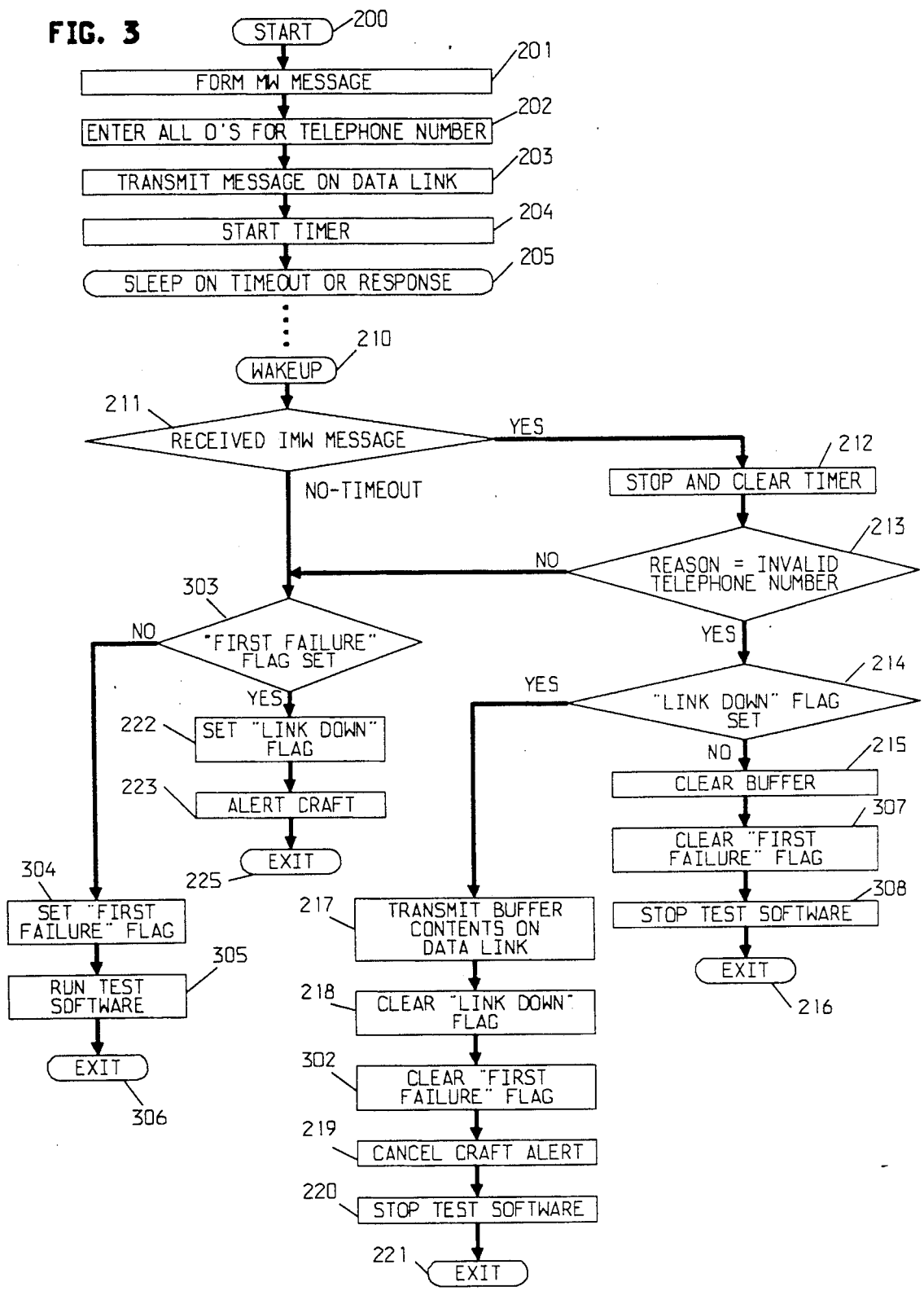

SWITCH-ADJUNCT COMMUNICATIONS PROTOCOL

TECHNICAL FIELD

This invention relates to protocols used for data communications between communication system switches and adjunct processors.

BACKGROUND OF THE INVENTION

The simplified message service interface (SMSI) protocol, also known as the simplified message desk interface (SMDI) protocol, is a standard protocol for data communications between communication system switches, such as telephony central office switches and PBXs, and adjunct processors, such as voice message systems. Unfortunately, the protocol is not robust: it does not provide a mechanism, such as an end-to-end "handshake", for checking the continued viability of the data link.

Data communications using this protocol are typically conducted over conventional RS-232 data links. The RS-232 physical layer protocol does provide a means for checking the connectivity of a data link by looping-around one of the protocol's leads. However, this mechanism only serves to check the physical, electrical, connectivity of the link, and provides no check on the proper transmission and receipt of, and response to, the information content of a sent communication.

SUMMARY OF THE INVENTION

This invention is directed to solving these and other disadvantages of the prior art. According to the invention, an intentionally-corrupted, i.e., an invalid, message is sent across the data link using the subject protocol to stimulate the return of a response message, and the continued viability of the data link is determined from the presence or absence of the response message. Illustratively, a message-waiting update message that is properly formatted (so as to be recognizable to its recipient) but intentionally corrupted by bearing invalid data is sent from an adjunct processor to a switching system across the data link, and receipt of an invalid message-waiting message from the switching system is awaited in response. Absence of the response message indicates lack of viability of the data link and leads to performance of a predetermined action such as alerting of craft, execution of maintenance routines, and/or retransmission of messages. Preferably, this procedure is repeated periodically to ensure the continued viability of the data link. The robustness of the subject protocol is markedly improved thereby.

These and other advantages and features of the present invention will become more apparent from the following discussion of an illustrative embodiment of the invention taken together with the drawing.

BRIEF DESCRIPTION OF THE DRAWING

FIG. 2 is an operations flow diagram of a first embodiment of the routine of the voice message system of the communication system of FIG. 1; and FIG. 3 is an operations flow diagram of a second embodiment of the routine of the voice message system of the communication system of FIG. 1.

DETAILED DESCRIPTION

Figure 1:
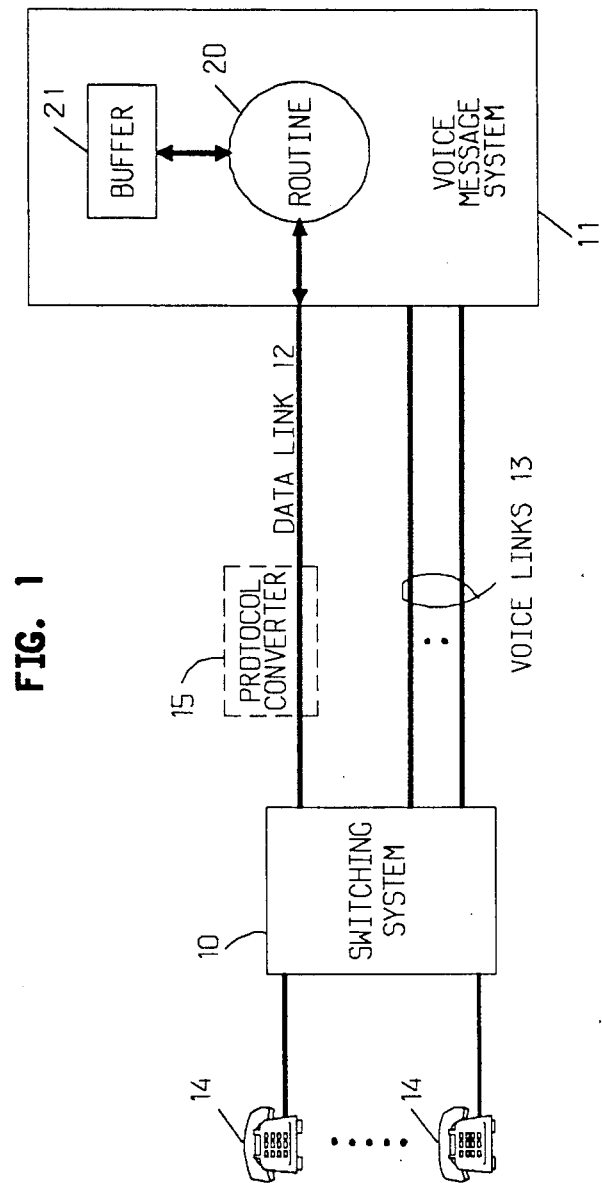
FIG. 1 is a block diagram of an illustrative communication system that includes an embodiment of the invention.

FIG. 1 shows an illustrative communication system that serves as an environment for the invention. A switching system 10, such as a telephone central office or a private branch exchange (PBX), provides communications services for a plurality of connected telephones 14 and their users. Services that are not provided by switching system 10 and its intelligence directly are provided indirectly via one or more applications processors that are connected to the switching system. One such service is a voice message service, provided by an applications processor aptly referred to as a voice message system 11. For purposes of this application, voice message system 11 is taken to be representative of all applications processors.

Voice message system 11 is connected to switching system 10 by a data link 12 and a plurality—a hunt group—of voice links 13. Switching system 10 and voice message system 11 use data link 12 to communicate to each other control information and data pertaining to voice communications on voice links 13, in a conventional manner. Systems 10 and 11 communicate over data link 12 using the RS-232 asynchronous data link protocol and the SMSI higher-level protocol.

If one or the other of the systems 10 and 11 internally uses a different protocol, a protocol converter 15 is interposed in data link 12 between systems 10 and 11 to provide conversion between the other protocol and the SMSI protocol. Illustratively, switching system 10 is the 5ESS ® switching system of AT&T, which uses the attached processor interface (API) protocol for communicating with adjunct processors, and protocol converter 15 is either the AT&T Switch Communications Adapter (SCA) protocol converter or the AT&T 3A SMSI Translator protocol converter, either one of which converts between the SMSI and API protocols.

The SMSI protocol consists of three message types. The messages have a common format: a message identifier field identifying which one of the messages it is, followed by a data field. The messages and their format are described in detail in *Interface Description-Interface Between Customer Premise Equipment—Simplified Message Desk—and Switching System—1AESS*, Bell Communications Research Technical Reference TR-TSY-000283 (July 1985), which is hereby incorporated herein by reference. A connect message, sent from system 10 to system 11, includes data in the data field that identifies: the port number on system 10 of voice link 13 that carries the call to which the connect message relates, the calling telephone number, the called telephone number, and the call type (the reason for redirection of the call from the called number to system 11). A message waiting update (MW) message, sent from system 11 to system 10, includes data in the data field that identifies: the number of telephone 14 whose message waiting indicator is to be controlled, and whether the indicator is to be turned on or off. An invalid message waiting (IMW) message, sent from system 10 to system 11 in case of failure of the task specified by an MW message, includes data in the data field that identifies: the number of telephone 14 whose message waiting indicator was to be controlled, and the reason for the task's failure, namely, whether the telephone number was invalid or whether the performance of the task was blocked by system 10 being too busy. Conventionally, these messages are sent between systems 10 and 11 without any acknowledgement.

In accordance with the invention, a modicum of robustness is provided within the SMSI protocol, including the capability of checking the proper transmission and receipt of, and response to, messages communicated over data link 12. For this purpose, voice message system 11 includes a routine 20 and a buffer 21. System 11 is processor-based and includes main memory or other appropriate storage for implementing buffer 21 and storing routine 20, as well as a CPU for executing routine 20. Buffer 21 serves as a temporary storage for MW messages. Each time system 11 sends a conventional MW message to system 10, it also stores a copy of the sent message in buffer 21. Routine 20 is executed periodically, illustratively every 30 seconds, and buffer 21 has sufficient capacity to store the maximum number of MW messages that can foreseeably be sent within some number of such periods—within two periods, or 60 seconds, in this example.

The operational characteristics of a first embodiment of routine 20 are flowcharted in FIG. 2. Upon each expiration of the predetermined time period, routine 20 begins to execute in system 11, at step 200. Routine 20 properly formats an MW message and populates it with data, at step 201. But instead of entering as data a valid telephone number, it corrupts the message by entering for the telephone number all zeros (or some other invalid sequence of digits such as a telephone number that is not served by or assigned on switching system 10, or a telephone number that does not have an associated message waiting indicator or is not assigned the message waiting service), at step 202. Routine 20 then transmits the properly-formatted but corrupted message bearing the invalid telephone number to switching system 10 over data link 12, at step 203. Routine 20 then starts a timer that times a period during which an IMW message in response to the corrupted MW message should be received from system 10 if all is in order, at step 204. Routine 20 then goes to sleep on the timer or the receipt of the IMW message, at step 205.

If all is well, switching system 10 receives the corrupted MW message, recognizes that the telephone number it carries is invalid, and responds by returning an IMW message to system 11 over data link 12. That IMW message indicates that the task commanded by the MW message was not completed because of an invalid telephone number. If all is not well, an IMW message is either not returned to system 11, or is returned indicating another reason for why the commanded task was not completed.

Routine 20 wakes up in response to timeout of the response period or receipt by system 11 of the IMW message, at step 210. If routine 20 was awakened by timeout of the response period at step 211, all is not well with data link 12, and so routine 20 sets an internal flag that indicates that data link 12 is "down", at step 222, alerts the craft to the problem, at step 223, starts execution of maintenance test software, at step 224, and then exits, at step 225, to await the expiration of the next predetermined time period when it will begin to execute again at step 200.

After the craft and/or execution of maintenance procedures has identified and fixed the problem and verified that all is well, re-execution of routine 20 can be started immediately, illustratively via a start signal issued by the maintenance software or a manual prompt entered by way of an administrative terminal of system 11, or routine 20 may be allowed to begin re-executing automatically upon expiration of the current predetermined time period.

Returning to step 210, if routine 20 was awakened by receipt of an IMW message, as determined at step 211, it stops and clears the response period timer, at step 212, and then checks whether the IMW message is valid—specifically, whether the reason indicated by the IMW message for non-completion of the task commanded by the corrupted MW message is that an invalid telephone number was given, at step 213. If not, all is not well with data link 12, and routine 20 proceeds to step 222 to respond as if no IMW message was received; if so, all is well with data link 12, and routine 20 checks whether the internal "link down" flag is set, at step 214. If the internal "link down" flag is set, it means that data link 12 is newly-recovered from a failure (steps 222-225). That failure may have lead to at least some of the MW messages that were transmitted by system 11 to system 10 since the last time that routine 20 verified the viability of data link 12 to not have been received or acted upon by system 10. Buffer 21 contains all MW messages that had been transmitted since the continued viability of data link 12 was last verified. Routine 20 therefore transmits the contents of buffer 21 over data link 12 to system 10, at step 217. Retransmission ensures that all of the MW messages are received and acted upon by system 10; no harm results from an MW message being received in duplicate and hence being acted upon twice. After retransmitting the MW messages at step 217, function 20 clears the internal "link down" flag that it set at step 221, at step 218, cancels the craft alert that it raised at step 222, at step 219, stops execution of the maintenance test software that it started at step 224, at step 220, and then exits, at step 221.

Returning to step 214, if the "link down" flag is not set, it means that data link 12 was viable and continues to be so. Consequently, retransmission of messages stored in buffer 21 is not necessary, and so routine 20 clears buffer 21 of any contents, at step 215, and then exits, at step 216.

Alternatively, routine 20 may be simplified by eliminating step 213, in which case the assumption is made that any received IMW message is valid, regardless of its information content. Also alternatively, routine 20 may be made more complex by including in the test of step 213 a test for proper IMW message format, and treating an improperly-formatted message as an invalid IMW message.

A second embodiment of routine 20 is flowcharted in FIG. 3. Unlike the embodiment of FIG. 2, this embodiment of routine 20 considers a single failure to receive a proper IMW message from switch 10 to be within tolerable limits for the proper operation of data link 12, and treats only the occurrence of two such failures in a row to be indicative of lack of viability of data link 12. The operational flow shown in FIG. 3 is a variation upon—an extension of—the operational flow shown in FIG. 2. Consequently, in FIG. 3, steps that are the same as those of FIG. 2 are designated by the same numbers as in FIG. 2.

Through step 211, the operation of both embodiments is the same. However, if routine 20 was awakened by timeout of the response time period at step 211 of FIG. 3, it is not necessarily cause for alarm. Rather, routine 20 checks an internal "first failure" flag, at step 303, to determine whether the immediately-preceding execution of routine 20 resulted in a failure to receive a proper IMW message. If not, routine 20 sets the "first failure"

flag, at step 304, starts execution of the maintenance test software, at step 305, and then exits, at step 306; if so, only then does routine 20 set the "link down" flag, at step 222, alert the craft, at step 223, and exit, at step 225.

Returning to step 210, if routine 20 is awakened by receipt of an IMW message, as determined at step 211, but the reason indicated by the IMW message for task non-completion is not an invalid telephone number, as determined at step 213, function 20 proceeds to step 303. If the indicated reason is an invalid phone number, as determined at step 213, and the "link down" flag is set, as determined at step 214, function 20 responds as in FIG. 2, at steps 217-221, but additionally clears the "first failure" flag that it had set at step 304, at step 302. If the indicated reason for task failure is found at step 213 to be an invalid telephone number and if the "link down" flag is found at step 214 to not be set, function 20 responds as in FIG. 2 by clearing buffer 21, at step 215, but additionally clears the "first failure" flag, at step 307, and stops execution of the maintenance test software that it started at step 305, at step 308, before exiting at step 216.

Of course, it should be understood that various changes and modifications may be made to the above-described illustrative embodiment of the invention. For example, more than two sequential failures to receive a proper IMW message may be accepted before data link 12 is considered to be "down". Also system 11 need not be a voice message system but may be any adjunct processor. Or, the protocol converter may itself be an attached processor. Such changes and modifications may be made without departing from the spirit and the scope of the invention. It is therefore intended that such changes and modifications be covered by the following claims.

We claim:

1. An adjunct processing system for use with a communication switching system connected to the adjunct processing system by a link having a data communication protocol, comprising:
    means for periodically transmitting on the link a formatted first data message of the data communication protocol including data requesting the switching system to perform a task, the format being valid and the data being intentionally invalid;
    means cooperative with the transmitting means for receiving on the link a second data message of the data communication protocol informing the adjunct processing system of non-performance of the requested task; and
    means cooperative with the receiving means for treating the link as not viable and performing a predetermined action if the receiving means do not receive the second data message in response to at least one transmission of the first data message, and treating the link as viable and not performing the predetermined action if the receiving means receive the second data message in response to each transmission of the first data message.

2. The adjunct processing system of claim 1 wherein the treating means treat the link as viable if the receiving means receive the second data message within a predetermined time period from each transmission of the first data message and treat the link as not viable if the receiving means do not receive the second data message within the predetermined time period from at least one transmission of the first data message.

3. The adjunct processing system of claim 1 wherein the treating means treat the link as not viable if the receiving means do not receive the second data message in response to two successive transmissions of the first data message.

4. The adjunct processing system of claim 1 wherein the second data message is one of valid and invalid; and wherein
    the treating means treat the link as viable if the receiving means receive the valid second data message in response to each transmission of the first data message and treat the link as not viable if the receiving means either do not receive the second data message or receive the invalid second data message in response to at least one transmission of the first data message.

5. The adjunct processing system of claim 1 further comprising
    means for storing messages transmitted on the link by the adjunct processing system; wherein
    the treating means comprise means for clearing the storing means in response to the receiving means receiving the second data message following a transmission of the first data message, and for transmitting the messages stored in the storing means on the link in response to the receiving means not receiving the second data message following at least one transmission of the first data message.

6. The adjunct processing system of claim 5 wherein the clearing and transmitting means transmit the messages stored in the storing means on the link in response to the receiving means not receiving the second data message following two successive transmissions of the first data message.

7. The adjunct processing system of claim 1 further comprising
    means for storing messages other than the first data messages transmitted on the link by the adjunct processing system; and wherein
    the treating means comprise
    means for clearing the storing means in response to the receiving means receiving the second data message following each one of two sequential transmissions of the first data message, and for transmitting on the link the messages stored in the storing means in response to the receiving means receiving the second data message following a transmission of the first data message sequential to a transmission of the first data message following which a second data message was not received.

8. An adjunct processing system for use with a communication switching system connected to the adjunct processing system by a link having a data communication protocol, comprising:
    means for periodically transmitting on the link a first data message of the data communication protocol requesting the switching system to perform a task, the first data message being intentionally corrupted;
    means cooperative with the transmitting means for receiving on the link a second data message of the data communication protocol informing the adjunct processing system of non-performance of the requested task;
    means for storing messages transmitted on the link by the adjunct processing system; and
    means cooperative with the receiving means and the storing means for clearing the storing means in response to the receiving means receiving the second data message within a predetermined time period from a transmission of the first data message and for transmitting the messages stored in the storing means on the link in response to the receiving means not receiving the second data message within the predetermined time period from each of two successive transmissions of the first data message.

9. The adjunct processing system of claim 8 wherein
the second data message further informs the adjunct processing system of a reason for the non-performance of the requested task; and wherein
the clearing and transmitting means comprise
means for determining whether a received second data message gives a correct reason, the reason being invalidity of the first data message; and
means responsive to the determining means for clearing the storing means in response to the receiving means receiving a second data message determined to give the correct reason within the predetermined time period from a transmission of the first data message and for transmitting the messages stored in the storing means on the link in response to the receiving means either not receiving the second data message or receiving a second data message determined to give a reason other than the correct reason within the predetermined time period from each of two successive transmissions of the first data message.

10. A method of operating a communication system that includes an adjunct processing system, a communication switching system, and a link having a data communication protocol and interconnecting the switching system and the adjunct processing system, comprising the steps of:
transmitting on the link a formatted first data message of the data communication protocol including data requesting the switching system to perform a task, the format being valid and the data being intentionally invalid;
treating the link as not viable and performing a predetermined action in response to not receiving the second data message following the transmission of the first data message;
treating the link as viable and not performing the predetermined action in response to receiving on the link a second data message of the data communication protocol informing the adjunct processing system of non-performance of the task requested by the transmitted first data message; and
periodically repeating the preceding steps.

11. The method of claim 10 wherein
the step of treating the link as viable comprises the step of
treating the link as viable in response to receiving the second data message within a predetermined time period following the transmission of the first data message; and wherein
the step of treating the link as not viable comprises the step of
treating the link as not viable in response to not receiving the second data message within the predetermined time period following at least one transmission of the first data message.

12. The method of claim 10 wherein
the step of treating the link as not viable comprises the step of
treating the link as not viable in response to not receiving the second data message following each of two successive transmissions of the first data message.

13. The method of claim 10 wherein
the second data message is one of valid and invalid; wherein
the step of treating the link as viable comprises the step of
treating the link as viable in response to receiving on the link the valid second data message following the transmission of the first data message; and wherein
the step of treating the link as not viable comprises the step of
treating the link as not viable in response to either not receiving the second data message or receiving the invalid second data message following the transmission of the first data message.

14. The method of claim 10 further comprising the step of
storing messages transmitted on the link by the adjunct processing system; wherein
the step of treating the link as viable comprises the step of
clearing the stored messages in response to receiving the second data message following a transmission of the first data message; and
the step of treating the link as not viable comprises the step of
transmitting the stored messages on the link in response to not receiving the second data message following at least one transmission of the first data message.

15. The method of claim 14 wherein
the step of transmitting the stored messages comprises that step of
transmitting the stored messages on the link in response to not receiving the second data message following each of two successive transmissions of the first data message.

16. The method of claim 10 further comprising the step of
storing messages other than the first data messages transmitted on the link by the adjunct processing system; wherein
the step of treating the link as viable comprises the step of
clearing the stored messages in response to receiving the second data message following each one of two sequential transmissions of the first data message; and
the step of treating the link as not viable comprises the step of
transmitting the stored messages on the link in response to receiving the second data message following a transmission of the first data message sequential to a transmission of the first data message following which a second data message was not received.

17. The method of claim 10 wherein
the step of transmitting comprises the step of
transmitting the first data message from the adjunct processing system to the communication switching system; the method further comprising the step of
transmitting the second data message from the communication switching system to the adjunct processing system in response to receipt of the first data message by the communication switching system.

18. A method of operating a communication system that includes an adjunct processing system, a communication switching system, and a link having a data communication protocol and interconnecting the switching system and the adjunct processing system, comprising the steps of:
- storing messages transmitted on the link by the adjunct processing system;
- transmitting on the link a first data message of the data communication protocol requesting the switching system to perform a task, the first data message being intentionally corrupted;
- clearing the stored messages in response to receiving on the link a second data message of the data communication protocol informing the adjunct processing system of non-performance of the task requested by the transmitted first data message within a predetermined time period following the transmission of the first data message;
- transmitting the stored messages on the link in response to not receiving the second data message within the predetermined time period following each of two successive transmissions of the first data message; and
- repeating the preceding steps, including repeating the second step periodically.

19. The method of claim 18 wherein
the second data message further informs the adjunct processing system of a reason for the non-performance of the requested task; the method further comprising the step of
determining whether a received second data message gives a correct reason, the correct reason being invalidity of the first data message; wherein
the step of clearing the stored messages comprises the step of
clearing the stored messages each time a second data message received within the predetermined time period following a transmission of the first data message is determined to give the correct reason; and wherein
the step of transmitting the stored messages comprises the step of
transmitting the stored messages on the link in response to either not receiving the second data message or determining that a second data message received within the predetermined time period following each of two successive transmissions of the first data message gives a reason other than the correct reason.

20. The method of claim 18 wherein
the step of transmitting comprises the step of
transmitting the first data message from the adjunct processing system to the communication switching system; the method further comprising the step of
transmitting the second data message from the communication switching system to the adjunct processing system in response to receipt of the first data message by the communication switching system.

* * * * *